United States Patent
Traversat et al.

[11] Patent Number: 6,119,129
[45] Date of Patent: Sep. 12, 2000

[54] MULTI-THREADED JOURNALING IN A CONFIGURATION DATABASE

[75] Inventors: Bernard A. Traversat, San Francisco; Tom Saulpaugh, San Jose; Jeffrey A. Schmidt, Boulder Creek; Gregory L. Slaughter, Palo Alto, all of Calif.

[73] Assignee: Sun Microsystems, Inc., Palo Alto, Calif.

[21] Appl. No.: 09/107,048

[22] Filed: Jun. 29, 1998

[51] Int. Cl.[7] .................................................. G06F 17/30
[52] U.S. Cl. .............................................. 707/202; 714/20
[58] Field of Search .................................. 707/200, 202; 714/15, 20

[56] References Cited

U.S. PATENT DOCUMENTS

| 5,706,453 | 1/1998 | Cheng et al. | 345/347 |
| 6,012,094 | 1/2000 | Leymann et al. | 709/230 |
| 6,021,414 | 2/2000 | Fuller | 707/202 |

FOREIGN PATENT DOCUMENTS

WO 97/49023  12/1997  WIPO .
WO 98/31124  7/1998  WIPO .

*Primary Examiner*—Paul V. Kulik
*Attorney, Agent, or Firm*—Beyer Weaver & Thomas LLP

[57] ABSTRACT

A method and system for creating and maintaining a journal of transactions directed to a configuration database is disclosed. A multi-threaded journaling method logs transactions in a configuration database by first receiving a database transaction, the transaction being either a single modification, e.g. insertion, deletion, update, or a series of modifications directed to the configuration database. An initial entry is inserted into a journal file where the initial entry includes a transaction identifier or handle that corresponds to the database transaction. Subsequent entries are inserted into the journal file corresponding to the specific updates of the transaction, the subsequent entry containing the transaction identifier and actual transaction data relating to the specific update. The journaling mechanism then determines whether each of the specific updates to the configuration database has been successfully completed. A final entry for the transaction is inserted based on the determination of whether each of the specific updates was successfully completed.

4 Claims, 9 Drawing Sheets

MULTI-THREADED JOURNALING IN A CONFIGURATION DATABASE

CROSS-REFERENCES TO RELATED APPLICATIONS

This application is related to U.S. patent application Ser. No. 60/085,425, filed on May 14, 1998, entitled "JAVA SYSTEM DATABASE," which is incorporated herein by reference.

BACKGROUND OF THE INVENTION

1. Field of the Invention

The present invention relates generally to computer software and computer network applications. More specifically, it relates to journalling and recovery mechansims for configuration databases in computer networks.

2. Discussion of Related Art

One type of conventional computer network involves connecting a series of personal computers referred to as clients (e.g., Sun SPARC workstations or IBM PCs), to one or more server computers. The client computers are generally self-sufficient and contain within their own memory much of the information needed to run user applications and perform network operations. That is, they contain information regarding their own configuration with regard to both software and hardware capabilities and requirements. The client computers typically access the network servers for a variety of reasons such as, for example, accessing network software applications, sending and receiving email, retrieving and storing information on a network database. However, information specific to a particular client computer generally resides on the client computer. This information can include, for example, the amount of memory or databus types, hardware specifications, such as what type of databus or additional processors. Since the client computers are relatively self-sufficient and store their own configuration information (and, thus is not available on the server computer), the task of data and application management on a client computer has become increasingly burdensome.

In the conventional network configuration, the process of installing new software or new applications is a static process. In such a configuration, the configuration information for each PC is defined on each client machine. Thus, the network administrator must statically define each configuration on each PC. In a conventional computer network configuration, configuration information for each particular sub-system or client is hardcoded in the particular client. Furthermore, with conventional network configurations using self-sufficient clients connected to network servers, application maintenance such as installing new versions or major upgrades to software, where the upgrade requires knowledge or access to a subsystem's configuration, normally requires that the application or the network be "brought down" to do the maintenance.

With conventional computer networks that have multiple clients and a server in which the server contains information that is needed by a client for various reasons, in many cases all the data on the server needed by or relevant to the client is moved from the server to the client. This can typically involve moving large amounts of data, much of which may not be used or is not necessary for the client to operate. Transferring all the data to the client is inefficient and increases network traffic. In addition, the client must have sufficient memory and storage to store all information relating to that particular client from the server. For example, devices such as PDAs and smart cards which do not have large amounts of storage cannot contain in its own memory all information including configuration information that might be relevant to that particular device.

Present methods of journalling or tracking updates, modifications, or inserts (i.e. transactions) made to configuration databases lack certain key features required in high-volume, real-world networks and that are expected in practical day-to-day operations. Generally, configuration databases do not have adequate recovery mechanisms to recover transactions or operations made to the database, and related data, in the event of a "crash" or other catastrophic failure. The data stored in a configuration database is typically sensitive data that must be recoverable in the event of a failure, whether of a single transaction or of the entire database. Journalling mechanisms of present configuration databases typically do not have the granularity or robustness that would allow a system or network administrator to examine a journal to see, for example, which operation by an end-user corrupted or damaged the configuration database. In addition, most journalling mechanisms for configuration databases are tailored for a specific type of memory or persistent storage medium, such as a specific relational database, a particular directory service, or other specific storage mechanism. This limits the portability and flexibility of the configuration database and the journalling mechansim.

Recently, fully functional and reliable journalling mechanisms have become necessary since computer networks have been growing in terms of types of computers and functionality, and particularly in terms of number of users, which in some networks has been increasing exponentially. Thus, recent configuration databases contain large amounts of data. In addition, the information contained in configuration databases has been growing more complex with time and is also updated more frequently than was done in earlier configuration databases which were significantly more static in nature. In addition, most journalling mechanisms associated with databases have the function of returning the database to a consistent state, which is adequate for certain purposes but may not for those where all the data must be recovered to ensure high availability of the clients, such as network computers.

Therefore, it would be desirable to have a journalling mechanism for a configuration database that maintains a detailed journal of all updates and modifications made to the database. It would also be desirable to have a journalling mechanism that contains actual data relating to the updates and modifications to allow a full reconstruction of the configuration database in the event of a failure. It would also be desirable to have a generic journalling mechanism in that it can function independent of the type of persistent storage being used to store the configuration database.

SUMMARY OF THE INVENTION

To achieve the foregoing, and in accordance with the purpose of the present invention, a multi-threaded journaling method for logging transactions in a configuration database system is described. In one aspect of the invention, a database transaction directed to the configuration database is received by the journaling mechanism, the database transaction having one or more specific updates effecting the configuration database. An initial entry is inserted into a journal file where the initial entry includes a transaction identifier or handle that corresponds to the database transaction. A subsequent entry is inserted into the journal file corresponding to the specific updates of the transaction, the subsequent entry containing the transaction identifier and actual transaction data relating to the specific update. The journaling mechanism then determines whether each of the specific updates to the configuration database have been successfully completed. A final entry for the transaction is inserted based on the determination of whether each of the specific updates were successfully completed.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A configuration data framework or schema, and method of journalling and recovering transactions made to the schema among computers in a computer network is described in the various drawings. The present invention discloses a hierarchy or data schema for representing and storing configuration information and related information in a system database. Also disclosed is a journalling mechanism that logs transactions made to a configuration database and provides a basis for recovering operations in a transaction that update or modify data in the configuration database. For the purposes of illustrating one embodiment of the present invention, a Java system database (JSD) is examined. In other preferred embodiments, the system database can operate on other types of platforms. The JSD of the described embodiment is a single subsystem that includes at least two major sub-components, or sub-schemes: the client schema and the server schema.

In the described embodiment, data relating to client machine and user configuration in a network is stored in on a server as part of a server JSD. The configuration information for each client, also referred to as subsystem, is stored in the server schema. This is in contrast to conventional networks where configuration information regarding a client is hardcoded or stored on the client machine. The data schema of the present invention allows a network administrator to manage configuration information for each of the computers in the network from a central repository such as a single server. Thus, any software updates, version upgrades, or installation of new applications that require knowledge of and access to a subsystem configuration can be implemented from the central repository and propagated to the individual clients. Users on the client machines will not have to exit applications and, moreover, the network does not have to be brought down for maintenance in order to install or propagate the new upgrade or version of the application.

Figure 1:
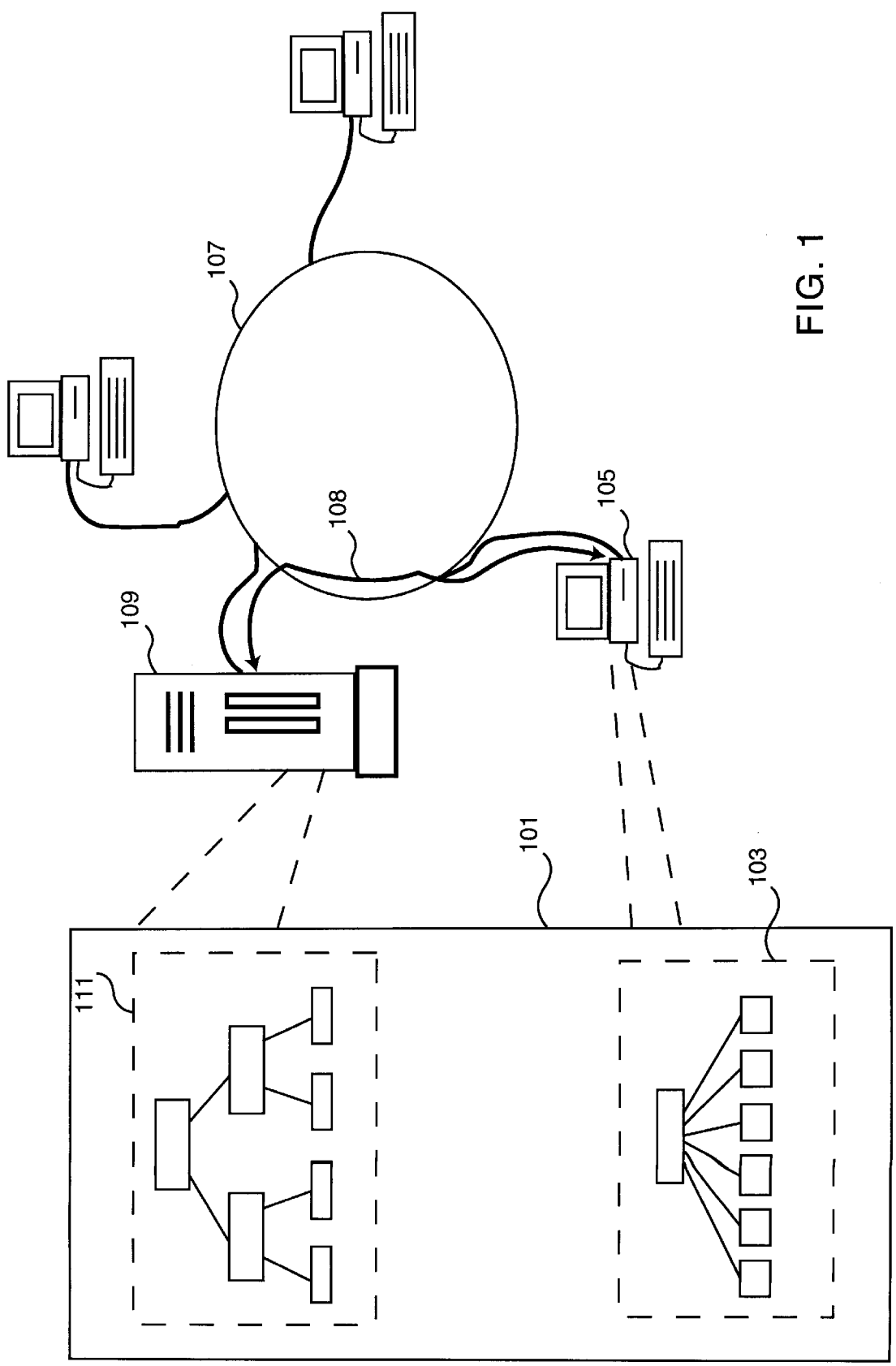
FIG. 1 is a block diagram showing components of a computer network configuration showing a system-wide data schema in accordance with one embodiment of the present invention.

FIG. 1 is a block diagram showing components of a computer network configuration showing a system-wide data schema in accordance with one embodiment of the present invention. In the described embodiment, the system-wide data schema is illustrated as a Java system database JSD (101) that consists of a client schema 103 which resides on a client machine 105 as part of network 107. A server schema 111 resides on a server computer 109 which is part of network 107.

Figure 2:
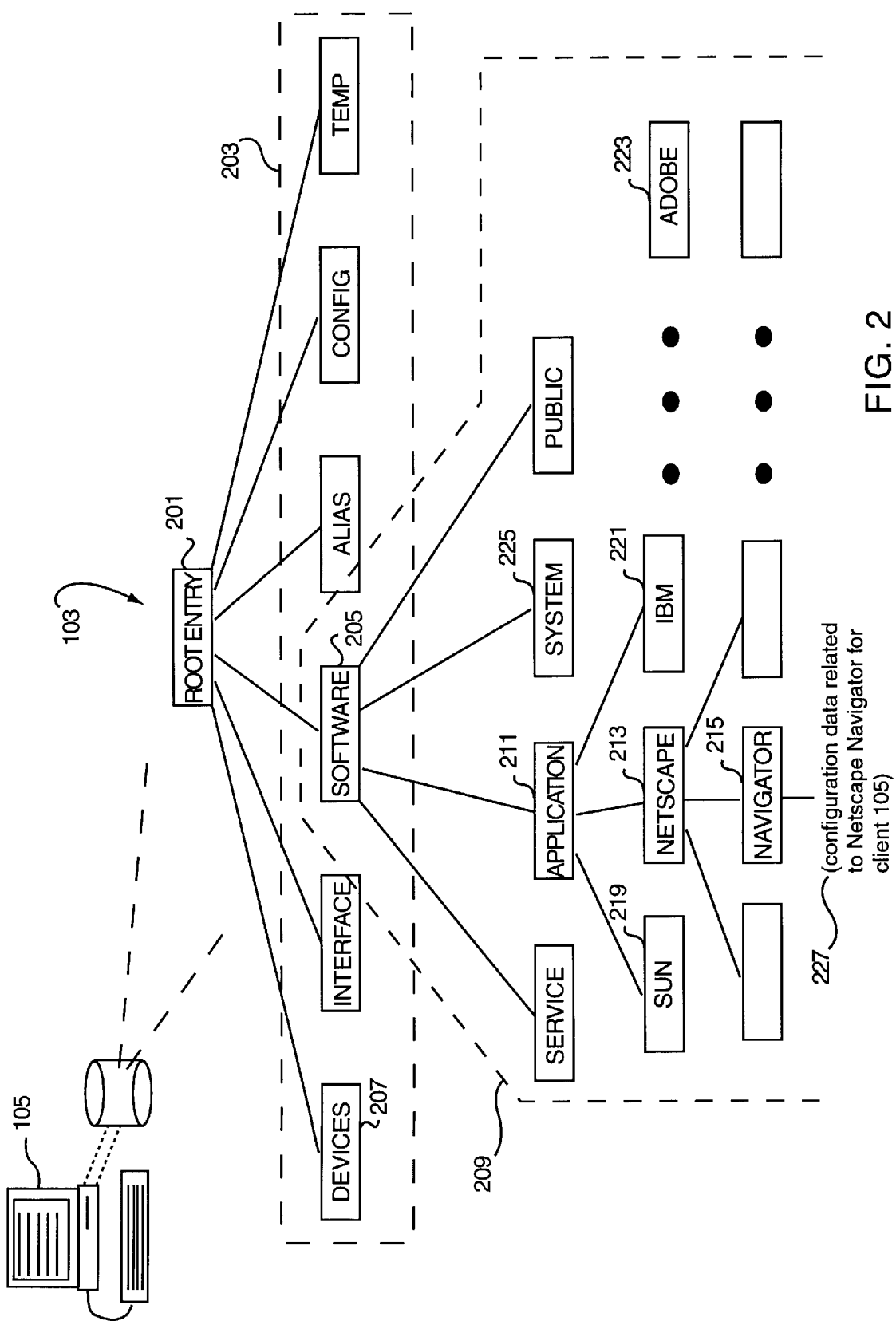
FIG. 2 is an illustration of an n-way tree structure representing client schema hierarchy in accordance with one embodiment of the present invention.

FIG. 2 is an illustration of an n-way tree structure representing client schema hierarchy 103 in accordance with one embodiment of the present invention. The hierarchy of client schema 103 as well as the hierarchy of server schema 111, is manifested using an n-way tree. At the root of the tree is a root entry 201 which does not contain any data and is the only node framework in the hierarchy that references itself. A first level of nodes 203 in client schema 103 collectively define individual namespaces in the generic client schema. The first level 203 in the hierarchy below root entry 201 and contains the namespace entries.

In the described embodiment, there are six namespaces in generic client schema 103. In other preferred embodiments, there may be more or fewer namespaces depending on the needs of a particular network configuration. In the described embodiment, the standard top level namespaces for the JSD client are SOFTWARE, DEVICE, INTERFACE, CONFIG, ALIAS, and TEMP. For example, the SOFTWARE namespace begins at node 205 and includes all nodes and data branching from node 205. The specific entries in layer 203 of the hierarchy are roots of sub-trees that define the unique namespaces. All entries in a particular namespace, such as SOFTWARE, are entries that relate to configuration data regarding software applications for client 105. Entries in the data schema of the present invention are made up of a unique name, a list of children (entries below the given entry) and a set of tuples. Each tuple contains a property name and associated property value. For example, in a word-processing program a property name can be "font" and the property value can be Palentino. Similarly, all entries under the DEVICE namespace 207 are entries that are related to configuration information of client machine 105 on which client schema 103 resides. Every entry in the hierarchy may act as both an entry in a sub-tree and the root of a sub-tree having descendent entries or children nodes. Each namespace in layer 203 is described in U.S. Provisional Application filed on May 14, 1998 and commonly assigned, entitled "JAVA SYSTEM DATABASE," Application Ser. No. 60/085,425 which is incorporated herein by reference.

As shown in FIG. 2, each entry in the tree has a single parent and can have several children nodes. A namespace such as SOFTWARE namespace 209 is a specially designated sub-tree that includes entries that relate to configuration data on software for a particular client such as client 105. As shown in FIG. 2 in the described embodiment, namespaces are always direct descendants of a root entry 201, also referred to as a super root. In other preferred embodiments, namespaces can be defined at other levels in the hierarchy and need not descend directly from root 201. The standard namespaces of the JSD schema client are created during the startup or booting procedure of the client computer. Each of the namespaces in the described embodiment are available in all implementations of the Java platform. The six namespaces are well known namespaces that are initialized by the Java platform. Other dynamically constructed namespaces can be added to the standard database namespaces after initialization.

SOFTWARE namespace 209, for example, contains a list of installed and/or available system services such as device drivers, user applications, and user configuration information. The software namespace is the only namespace in the client schema which is persistent in that a server provides a backup store for all entries in this namespace. A persistent namespace or entry is an entry entry that must be saved on a persistent storage location. Another type of namespace is a transient namespace which can be stored on temporary or volatile memory and need not be stored long-term or persistently. An example of persistent entries are configuration information related to user environments that need to be stored on persistent storage. When a user logs on, the user's last saved environment needs to be retrieved so he or she does not have to reset the environment. Persistent entries are entries that can be saved and retrieved from a permanent storage location. Persistent and transient namespaces are statically separated when namespaces are created. In the described embodiment, persistent entries are stored on a remote JSD server. In the described embodiment, under the SOFTWARE namespace there are four categories: application, system, service, and public. In the described embodiment, using the Java platform, some of the entries in the SOFTWARE namespace are arranged using Java-unique naming conventions and other non-Java related entries having naming conventions based on specific applications. In the described embodiment, company names such as IBM, Sun, or Lotus are given names such as com.IBM, com.Sun, and com.Lotus. These company names distinguish company-specific information. Entry names below the company entry are company-specific.

As described, the SOFTWARE namespace 209 is the only namespace of the six that has persistent storage in the described embodiment. The other namespaces such as DEVICE namespace 207 have transient storage. Entries in these namespaces are lost when the client computer is turned off. This is true in the described embodiment because the five transient namespaces store data that relates specifically to a client computer. In the described embodiment, the SOFTWARE namespace contains application configuration information which needs to be saved after the computer is turned off.

Under the software namespace are four categories: application, system, service and public. Using the application category as an example, an entry com.Netscape 213 contains the company-unique name (e.g., Netscape) and below com.Netscape entry 313 is an entry for one of Netscape's products Netscape Navigator. Under entry 215 is company-specific information 217 relating to Netscape Navigator.

Entries 219, 221 and 223 are entries for other vendors which will also have entries similar to entry 215. In the described embodiment, the structure of the device namespace 225 reflects some or all of the input/output bus or peripheral bus and the devices present on the client. In other words, the physical connectivity of buses and devices are represented as a tree of entries where a particular bus is the parent and leaf entries contain configuration data on the devices.

In the software namespace, the leaf node level of the hierarchy contains data 227 that is configuration specific and is arranged according to how the application, for example Netscape Navigator, wants to order the specific data in the leaf node level. For a word-processing application, the leaf node entries would contain specific information such as font, dictionary definitions, and other word-processing type configuration data.

Figure 3:
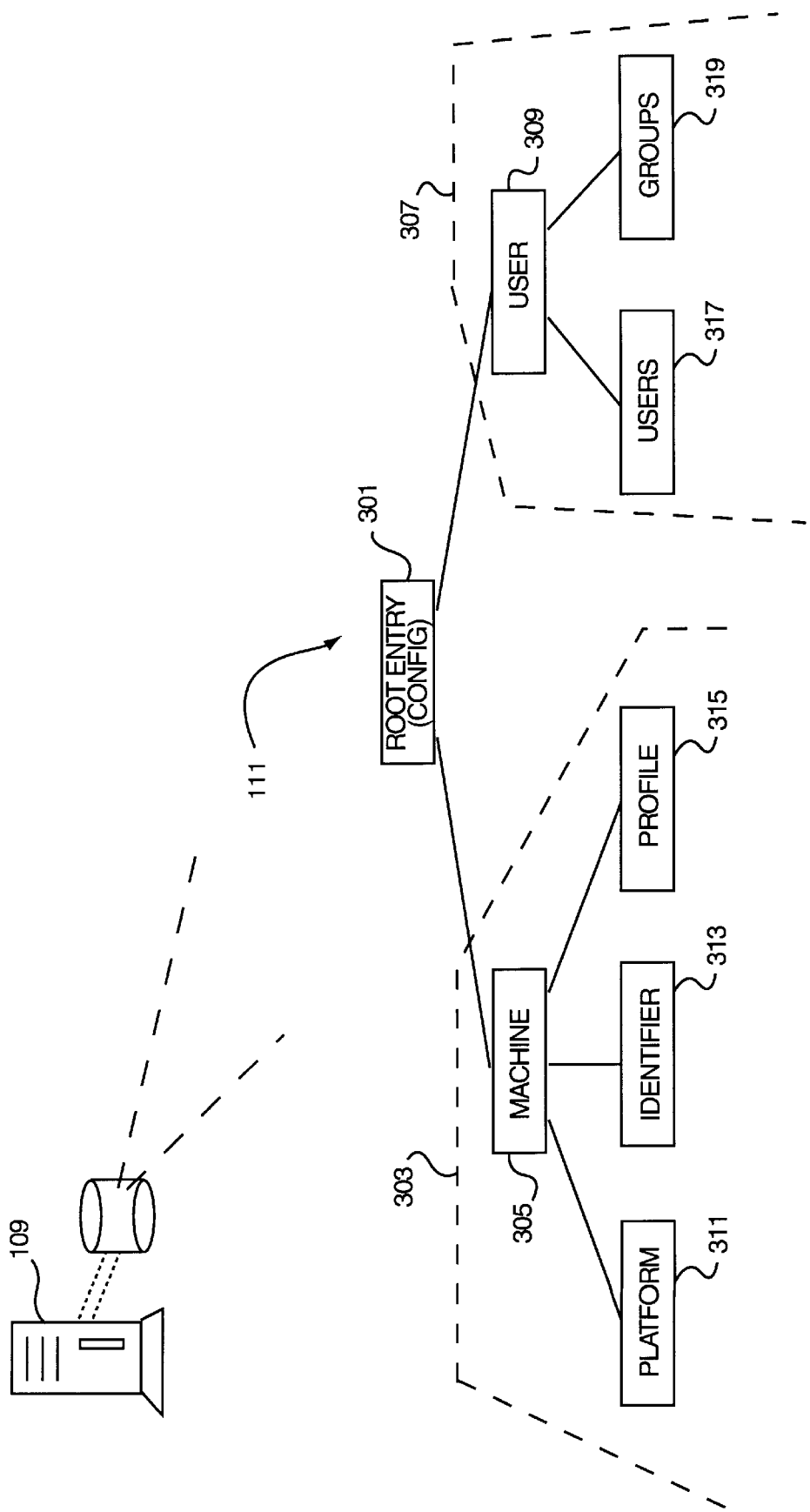
FIG. 3 is a block diagram showing a structure of a JSD server schema in accordance with one embodiment of the present invention.

The namespaces in the server schema component of the JSD are persistent storage spaces; that is, they remain after the client computer is turned off. In the described embodiment, there are two namespaces in the server schema: machine and user. FIG. 3 is a block diagram showing a structure of a JSD server schema in accordance with one embodiment of the present invention. It shows a server computer 109 and server schema 111 of FIG. 1 in greater detail. At the top of the n-way tree is a root entry 301, also representing a CONFIG namespace in the described embodiment. As mentioned, there are two sub-namespaces in the server schema. Area 303 represents a machine sub-namespace having a machine node 305. Area 307 represents a user sub-namespace having a user node 309.

Machine sub-namespace 303 is made up of three categories in the described embodiment. In other preferred embodiments, machine sub-namespace 303 may have more or fewer sub-categories depending on the platform and requirements of the network. The three categories or sub-ranges are platform 311 identifier 313, and profile 315. Under platform 311 are a number of entries that refer to specific computer manufacturers such Sun Microsystems and IBM Corporation.

The journaling mechanism or framework for the configuration database as described above of the present invention is a multi-threaded task and can be seen as a shell or wrapper around a persistent storage API. In the described embodiment, the configuration database is a Java System Database, or JSD, generally having two sides: a client JSD and a server JSD. In other preferred embodiments, the configuration database can be constructed on other platforms or can take the form of a more conventional database or file structure. A persistent storage API enables the server JSD, described above, to store its data in a persistent storage or memory, of which there can be various types.

Figure 4:
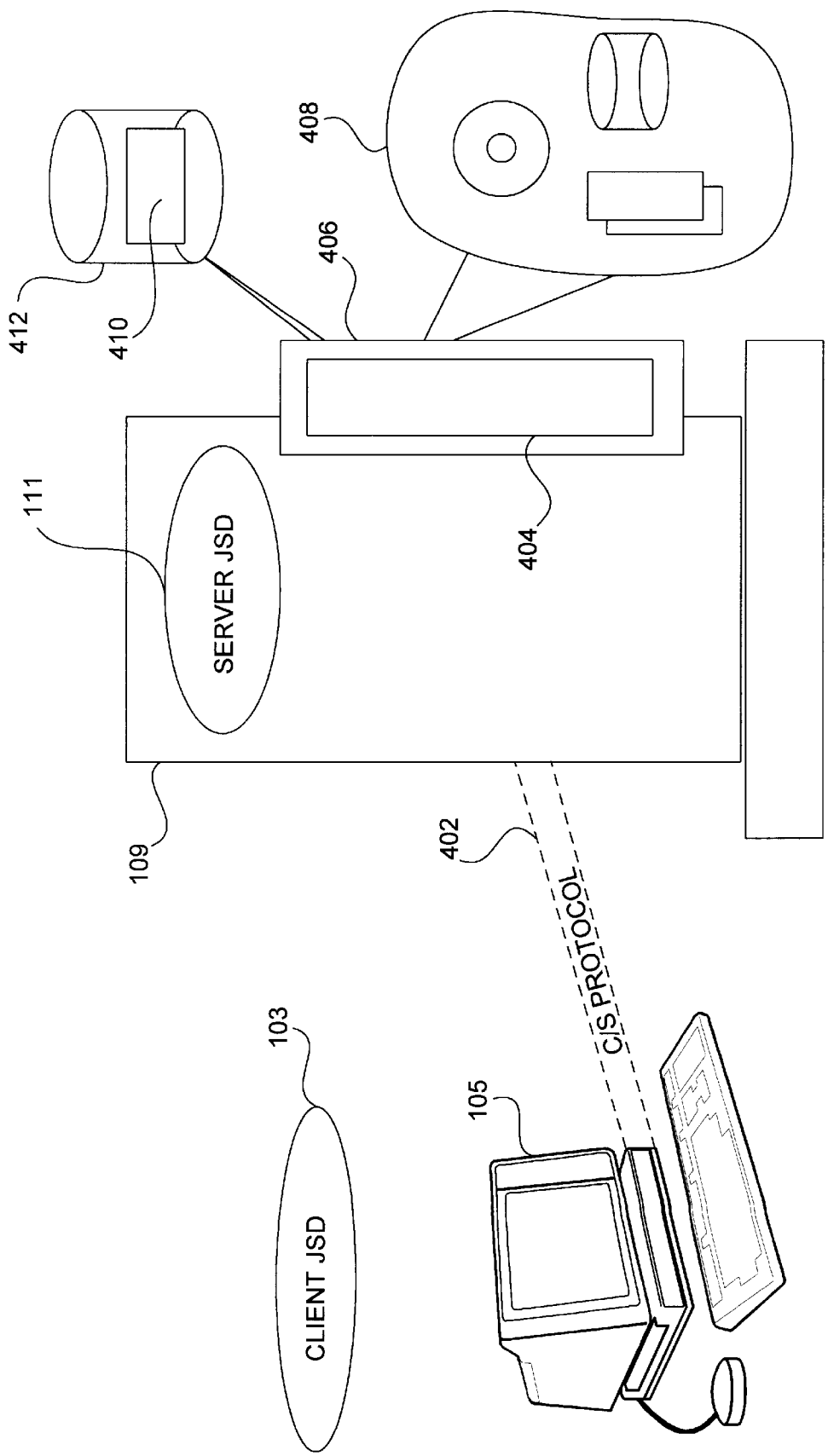
FIG. 4 is a block diagram of a system overview including the backend of a server and the journaling mechanism in relation to a Persistent Storage API in accordance with one embodiment of the present invention.

As mentioned above, the journalling mechanism of the present invention acts as a wrap-around layer on the persistent storage API, a component of the configuration database system. Stepping back from FIG. 1 which showed the two components of the JSD configuration database of the described embodiment (i.e. the client JSD and the server JSD), FIG. 4 shows a similar system overview that includes the "back-end" of the server 109 of FIG. 1, and the journalling mechanism in relation to a Persistent Storage API in accordance with one embodiment of the present invention. Several of the blocks in FIG. 4 are, for descriptive purposes, the same as those in FIGS. 1–3. Client computer 105 contains client JSD 103, shown in greater detail in FIG. 2. Client 105 communicates according to a client/server protocol 402 with server computer 109. Resident on server computer 109 is server JSD 111, shown in greater detail in FIG. 3. A persistent storage API 404 is shown at the backend of server 109. Persistent storage API 404 enables server JSD 111 to store the data in the configuration database in some type of physical storage media. Functionally linked to persistent storage API 404 is a journalling framework or mechanism 406, described in greater detail below. Configuration data is stored in various types of media, shown generally at 408, such as hard disk drives, directory services, file systems, and databases.

Journalling mechanism 406 produces journal data 410, described in greater detail below, stored on a persistent storage area 412 separate from persistent storage media 406. In the described embodiment, journal data 410 is stored and maintained separately from actual configuration data kept, generally, in storage 408, thereby significantly reducing the possibility of loosing all configuration data from a single memory storage crash or failure.

Figure 5:
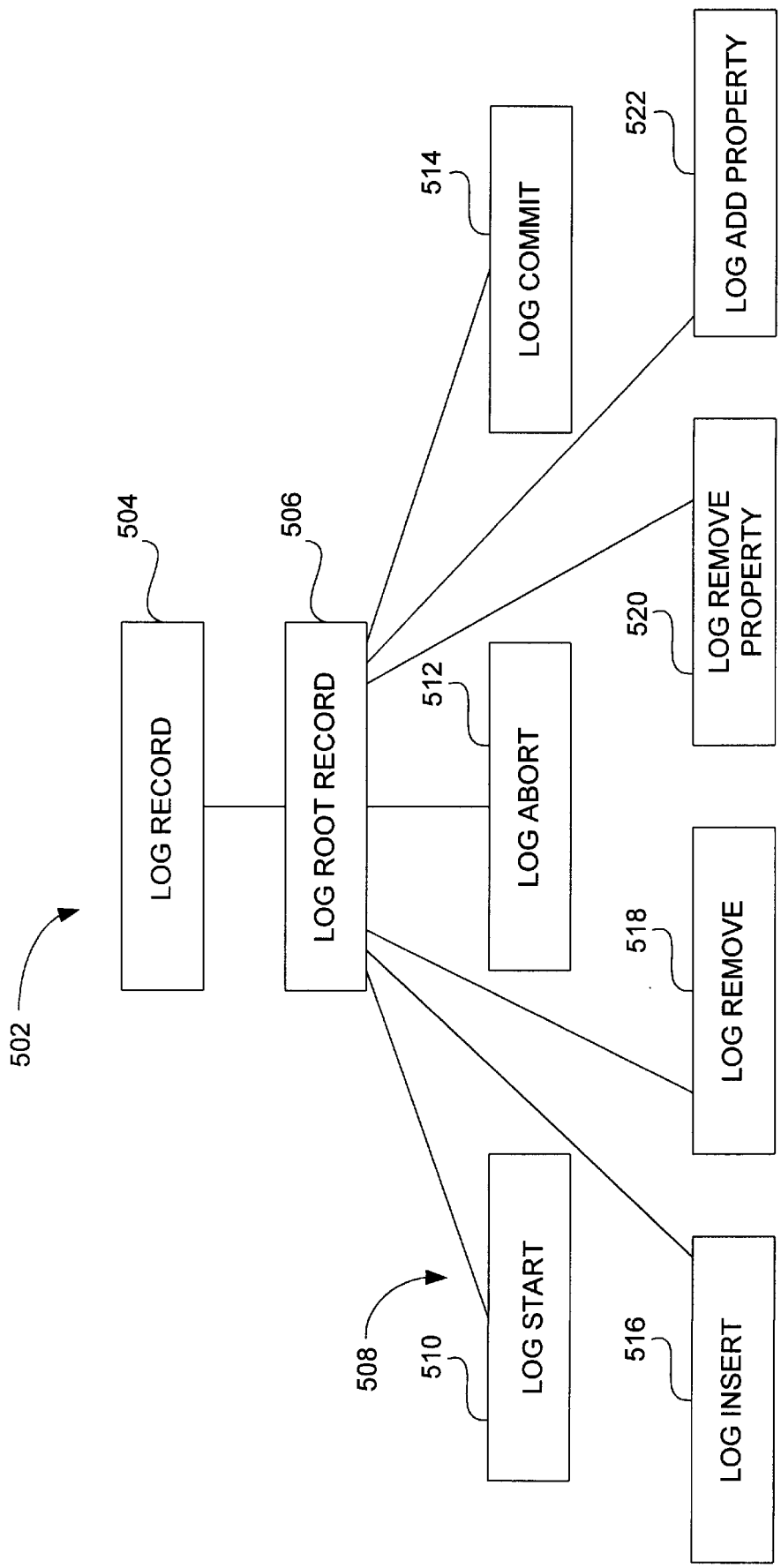
FIG. 5 is a block diagram of a class hierarchy of a journalling mechanism in accordance with one embodiment of the present invention.
Figure 6:
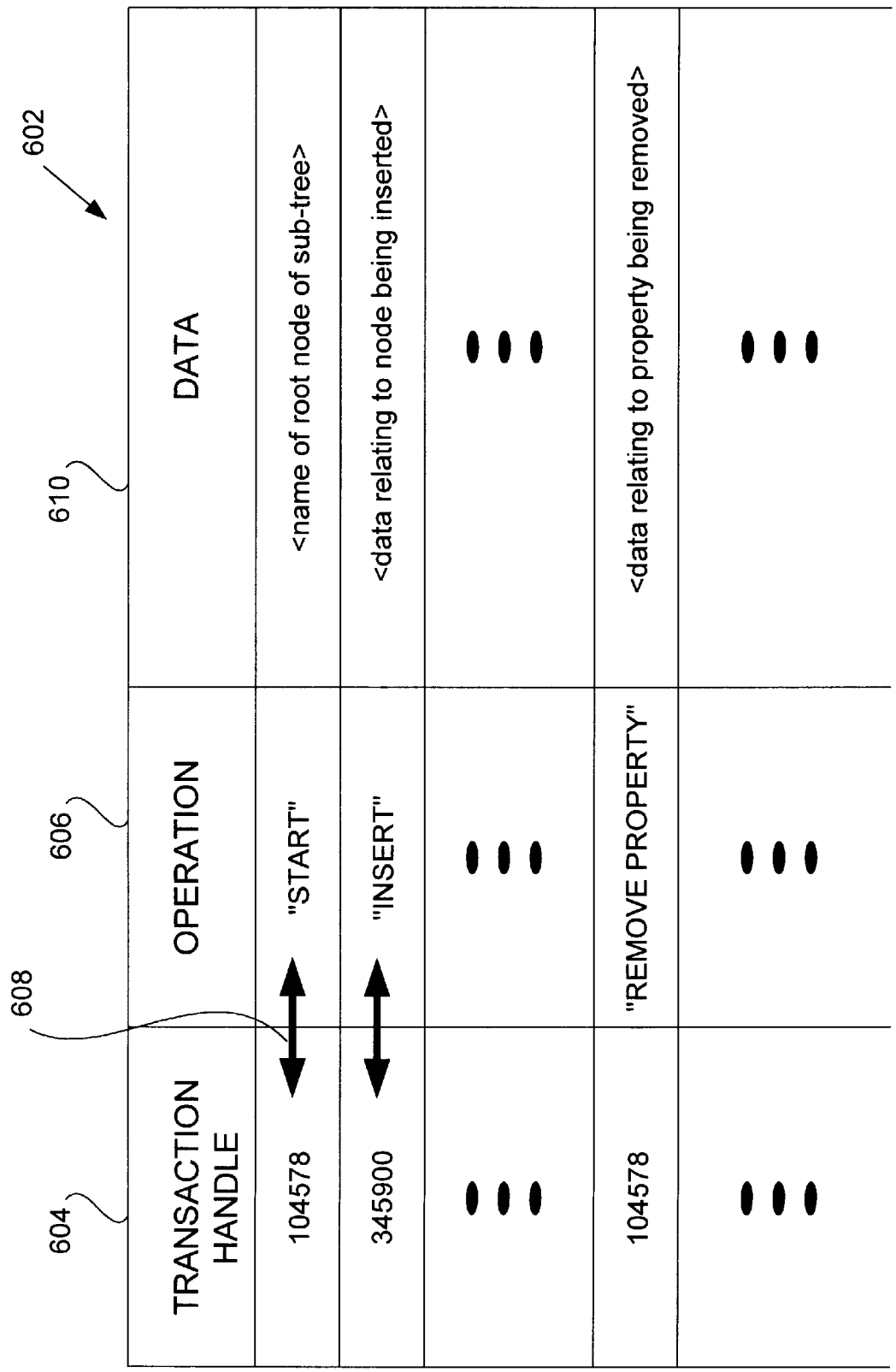
FIG. 6 is a schematic illustration of a journal created and maintained by the journalling mechanism in accordance with one embodiment of the present invention.

FIG. 5 is a block diagram of a class hierarchy of a journalling mechanism in accordance with one embodiment of the present invention. The classes and sub-classes described with respect to FIG. 5 are abstract and concrete definitions of a physical log record as stored in a journal file, both of which are shown in FIG. 6. When the server instantiates the persistent storage API, it can either provide a certain class hierarchy or it can use the default class hierarchy as shown in FIG. 5. In either case, the server only manipulates an abstract object, described below, which allows the addition of concrete objects so long as they follow the same interface or base entry. This feature is one of the advantages of using a Java platform. In other preferred embodiments, other object oriented platforms can be used to define a class hierarchy to achieve the same results.

At the top of class hierarchy 502 is a log record entry 504. Entry 504 can be referred to as a "base entry" of class hierarchy 502. It is an abstract definition of a log record and can be seen as an API or interface of the journalling framework. Log record entry 504 enables the journal to be independent of specific storage media since operations, or transactions, are stored as abstract JSD operations, as opposed to a specific operation (e.g. WRITE) to a specific persistent storage, such as file or database. In another example with regard to a recovery procedure (discussed in greater detail below), when recovery is initiated, it operates on abstracts objects, represented by log record 504. From the perspective of the recovery mechanism, as one example, it does not matter what type of record (INSERT, DELETE, UPDATE, etc.) is being recovered, it operates on the abstract definition, or base entry. The class below log record 504 is a log root record 506 represents a specific or concrete representation of log record 504. It defines an internal representation of a specific type of transaction. Below log root record 506 is a group of sub-classes shown generally at 508. Specific configuration database transactions, such as READ, WRITE, or UNDO, act on these specific sub-classes.

In the described embodiment, there are eight sub-classes: log start 510, log abort 512, log commit 514, log insert 516, log remove 516, log remove property 518, and log add property 520. In other preferred embodiments, there can be fewer or greater number of sub-classes under log root record 506. A specific instance where this can occur is described in greater detail below in the case where a server, upon start-up, can use the default class hierarchy described in FIG. 5 or use an alternative class hierarchy.

The specific sub-classes correspond to the basic operations that can be done on a configuration database. Log start sub-class 510 is a specific representation of a journal entry indicating the beginning or start of a single transaction, which can include several or one individual operations or updates. This entry is described in greater detail below with respect to FIGS. 6 and 7. Log abort 512 represents an abort transaction entry in the journal which occurs when there is a failure in performing an update in a transaction. The "opposite" of log abort 512 is a log commit 514. This represents an entry in the journal indicating that all updates that were part of a transaction were successfully committed or made in the configuration database. With both log abort 512 and log commit 514, locks on root nodes or leaf nodes in the database are released and any waiting threads are notified. Log insert 516 and log remove 518 represent, respectively, entries created when a node is inserted into the database (e.g. there is a new user or client computer in the network, or a new user group has been created) and when a node is deleted from the database. Recall that the database being referred to here is server JSD 11 1. As described above, a node can include several tuples or properties. Log remove property 520 and log add property 522 represent entries or operations in which a property is being deleted from a node or a property is being added to a node, respectively.

FIG. 6 is a schematic illustration of a journal created and maintained by the journalling mechanism in accordance with one embodiment of the present invention. In the described embodiment a journal is represented by a Unix file, shown as item 602. In other preferred embodiments, other types of files or data schemes can be used for constructing the underlying physical representation of a journal. A new journal 602 is created each time server 109 is brought up, and can be stored on a disk or file system accessible by the server but separate from the persistent storage containing the actual configuration data. Field 604 contains a transaction handle assigned to a transaction when it is created. In the described embodiment, the transaction handle is a unique identifier used to group entries in the journal belonging to the same transaction. This is useful, for example, in the journalling mechanism's recovery process.

As shown, individual updates belonging to the same transaction can be interspersed among the journal entries since the journalling mechanism is a multi-threaded process. Transaction handle field 604 is linked, shown by arrow 608 to operation field 606. Field 606 contains the type of operation being performed in a particular update. These were discussed with respect to sub-classes 508 in FIG. 5. Each entry in journal 602 is an instance of one of the seven sub-classes shown in FIG. 5 and is defined abstractly by log record 504. Following field 606 is data field 610 which contains the actual data, if any, associated with the specific operation. For the START operation, the data in field 610 is the name of the root, or parent, node of the sub-tree upon which the transaction will be acting. For the COMMIT and ABORT operations, there is no data in field 610 since these operations primarily involve releasing locks on nodes in the database after performing INSERT and REMOVE operations.

Figure 7:
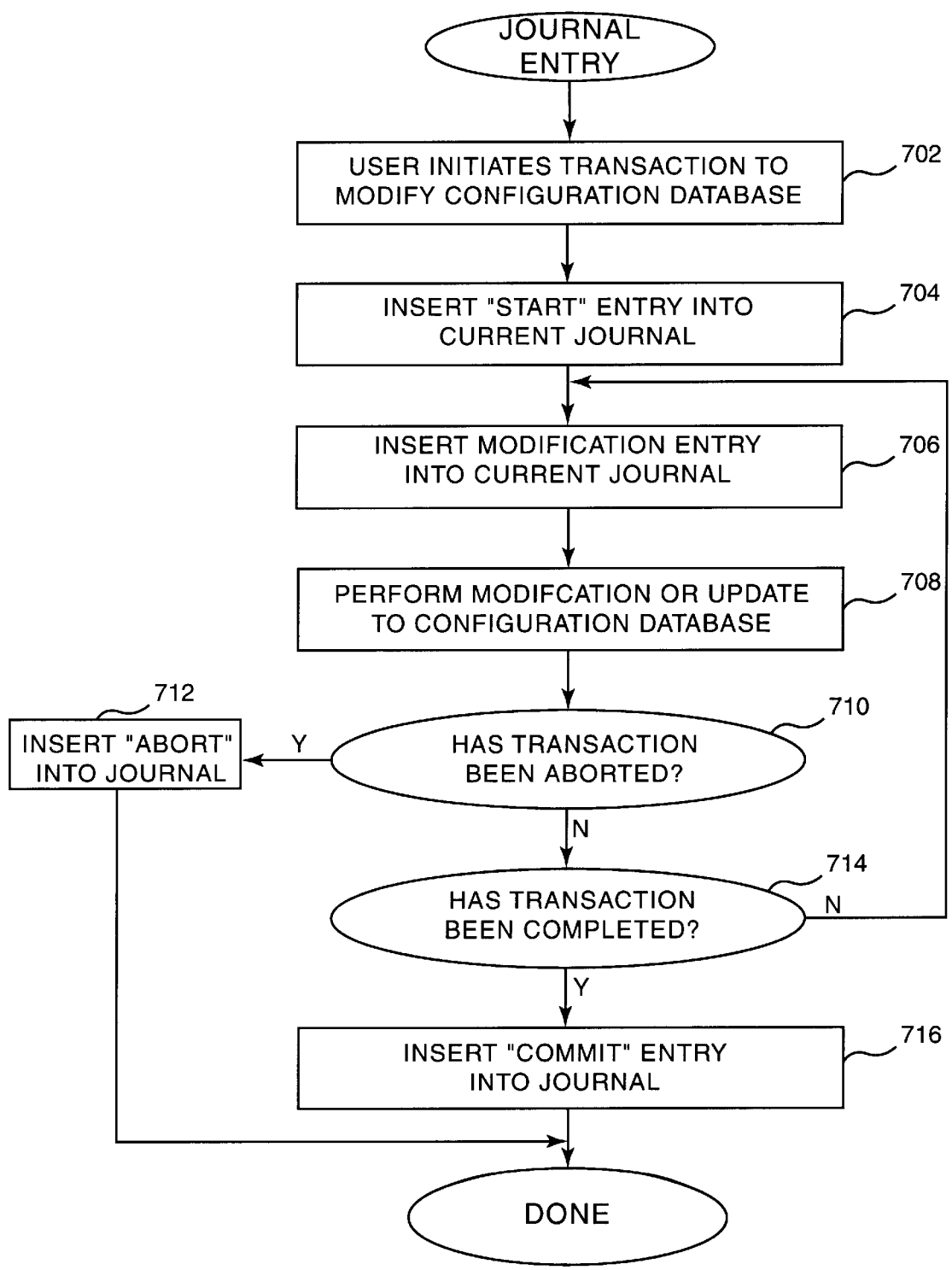
FIG. 7 is a flowchart of a transaction creating an entry in a journal in accordance with one embodiment of the present invention.

FIG. 7 is a flowchart of a transaction creating an entry in a journal in accordance with one embodiment of the present invention. At step 702 a user initiates a transaction directed to the configuration database. For an example using the described embodiment, this can be inserting a new user into user namespace 309 and under root entry 317 of the server JSD as shown in FIG. 3. At this step a transaction handle or identifier is assigned to the transaction. At step 704, a START entry is created and inserted in to the current journal to indicate that a new transaction has been initiated and has been assigned a transaction handle. Data field 610 can contain "USERS" if that is the name of the root node be effected by the transaction. At this stage nothing has been done to the configuration database. At step 706 the update entry is written to the journal. For example, an INSERT entry having the same transaction handle as the START entry and containing the name of the user and any other information contained in a USERS node in data field 610, is written to the journal. At step 708 the update is made to the configuration database. Using the INSERT example, a node representing the new user is inserted into a USERS sub-tree (or other appropriate sub-tree) of the configuration database. In the described embodiment, the update is made to the journal before being made to the server JSD to enable recovery of the database in the event a problem occurs after the update is made to the database. If the journal is updated first, if a problem does occur, the journal will have a record of what was attempted to be performed and can reconstruct the database if necessary. In other preferred embodiments, the order of the updates to the journal and the database can vary. For example, updates can be made to the database first or can be made to each at the same time.

At step 710 the configuration database checks whether the transaction has been aborted. This can occur for a various reasons. Using the INSERT user example, a user node with the exact same name and profile may already exist in the database, thereby causing a transaction abort. If this occurs, an ABORT record is entered in to the journal, again with the same transaction handle assigned to the START but no data in the data field 610, and the journalling process for the transaction is complete. If the transaction has not been aborted, control goes to step 714 where the database determines whether all the updates necessary for the transaction have been completed. If other updates need to be done to complete the transaction, control returns to step 706 where the next logical update is performed following steps 706 to 710. If the transaction is complete, a COMMIT entry is written to the journal indicating that a transaction has been completed. At this stage the process of journalling the updates making up the transaction initiated at step 702 is done.

Figure 8:
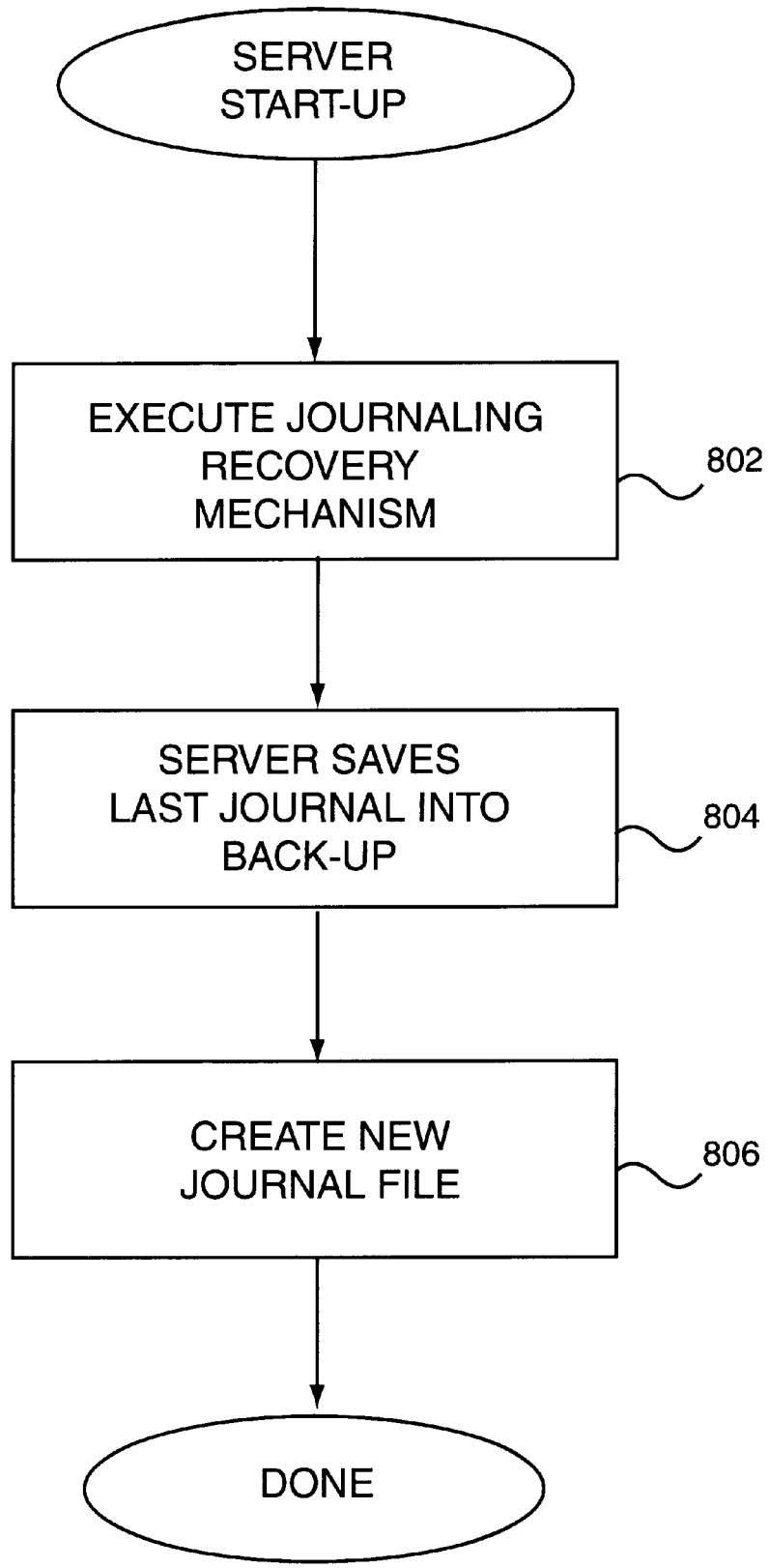
FIG. 8 is a flowchart of a server start-up process and how it relates to the journaling mechanism in accordance with one embodiment of the present invention.

FIG. 8 is a flowchart of a server start-up process and how it relates to the journalling mechanism in accordance with one embodiment of the present invention. Once a server, such as server 111 of FIG. 1, is started or brought up, certain basic steps are taken with respect to the journalling mechansim. At step 802 a recovery procedure is executed by the server process to put the database in a consistent state. Under normal shut-down of the server, the database is expected to be in a consistent state, in which case the recovery procedure is not needed to "fix" anything. This step is described in greater detail in FIG. 9. At step 804 the server saves the previous journal to back-up storage. The number of back-ups of previous journals that are kept is determined by the system or network administrator. At step 806 the server creates a new journal to hold entries for the session about to begin. In the described embodiment, this involves creating a new Unix file, typically residing on a hard drive accessible by the server.

A recovery mechanism is used when the server is re-started to bring the configuration database to a consistent state and normally only needs to go back, or scan the journal, as far as the last time the server was started. The recovery mechanism can reconstruct the entire configuration database, if necessary, since the journal contains not only the operation performed but the data relating to the transaction. This is possible since the journal uses a class hierarchy and stores its operations as abstract JSD operations. Thus, the recovery mechanism operates on abstract objects, i.e. log record 504, and is not concerned with what type the log record is.

Figure 9:
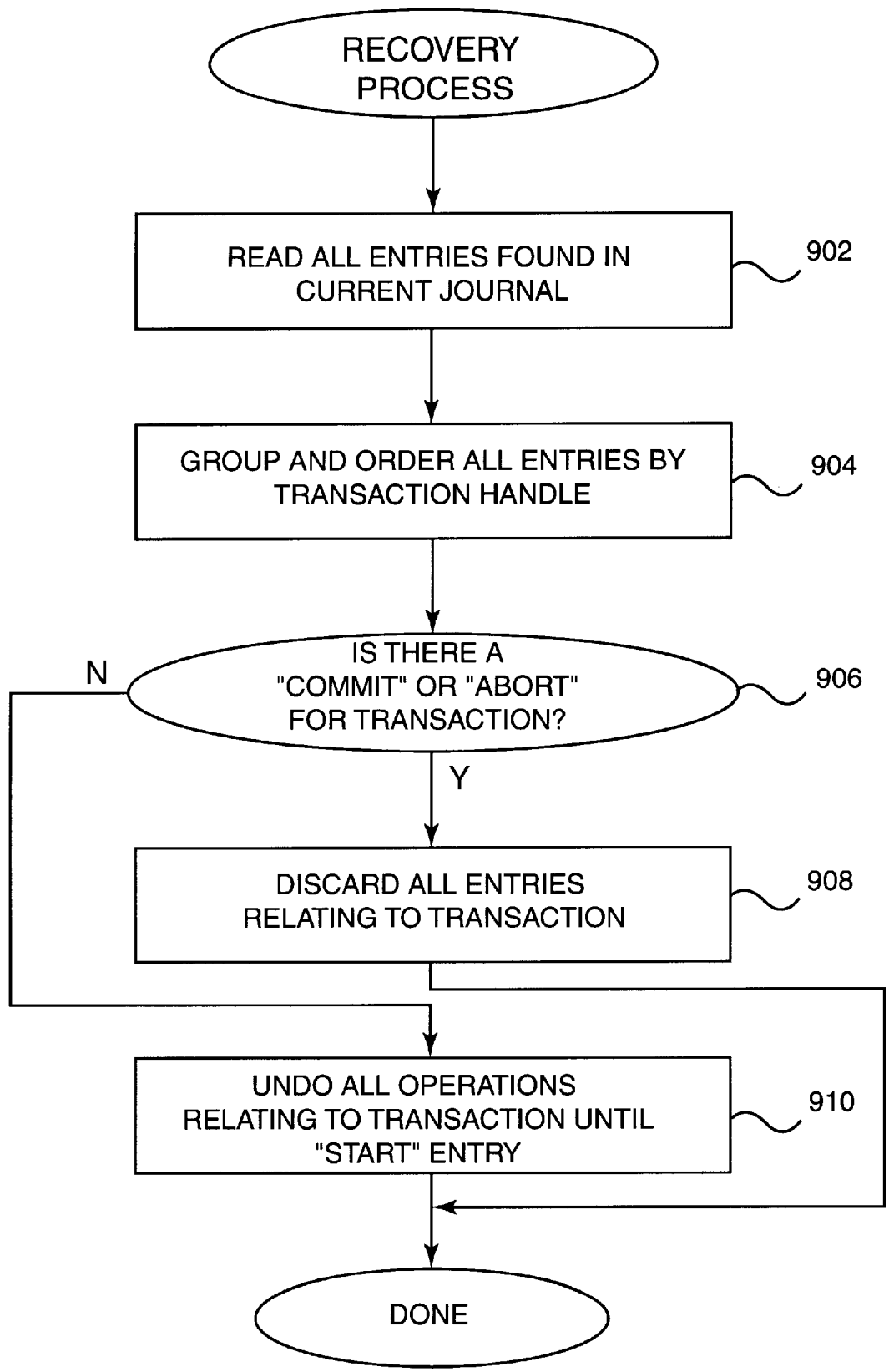
FIG. 9 is a flowchart of a recovery mechanism for a configuration database in accordance with one embodiment of the present invention.

FIG. 9 is a flowchart of a recovery mechanism for a configuration database in accordance with one embodiment of the present invention. At step 902 the journalling mechanism reads all the entries found in the current journal. At step 904 all entries in the journal are combined or grouped according to the transaction handle. As described above, all updates or operations for the same transaction have the same transaction handle, starting with the START operation for a transaction and ending with either a COMMIT or an ABORT for that transaction. All the operations in this transaction will be inserted in the journal in the order in which they are performed but can, and most likely will, be interleaved with operations from other transactions to the database. At step 904 all entries are grouped and, by virtue of the journalling process, ordered by transaction handle or identifier. At step 906 the journalling process checks whether, for each transaction, there is a COMMIT or ABORT entry. If there is, the entries for this transaction are discarded at step 908 since this indicates that the transaction was effectively completed, and the database properly reflects the data from that transaction, and the recovery process for that transaction is complete. At this stage, control returns to step 906 where the next transaction is checked. If an ABORT or COMMIT entry for a transaction is not found, the journalling mechanism performs an "undo" operation on each of the entries in that transaction group at step 910. This indicates that the operations for that transaction were not, in a sense, finalized and, therefore, the data relating to those operations are likely not correctly reflected in the configuration database. The undo operation essentially reverses or performs the complimentary operation of each operation performed in the transaction. Thus, if an entry indicates an INSERT of a node containing the text "John E. Smith," the complimentary operation would be a REMOVE of the node thereby deleting the node and the text "John E. Smith" from the configuration database. These undo operations are performed on each entry in the transaction, in the reverse order in which they were made, until a START entry is reached.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the configuration database has been described as a Java system database, it can be implemented on object-oriented platforms other than Java and still use the concepts described in the invention. Accordingly, the present embodiments are to be considered as illustrative and not restrictive, and the invention is not to be limited to the details given herein, but may be modified within the scope and equivalents of the appended claims.

What is claimed is:

1. A multi-threaded journaling method of logging transactions in a configuration database, the method comprising:

receiving a database transaction directed to the configuration database, the database transaction having one or more specific updates effecting the configuration database;

inserting an initial entry corresponding to the database transaction into a journal file, the initial entry including a transaction identifier;

inserting one or more subsequent entries into the journal file corresponding to the one or more specific updates to the configuration database associated with the transaction, the subsequent entry containing the transaction identifier and data relating to the specific update;

determining whether each one of the one or more specific updates to the configuration database is successfully completed; and inserting a final entry into the journal file according to the determination of whether each one of the one or more specific updates is successfully completed.

2. A system for multi-threaded journaling of transactions in a configuration database, the system comprising:

a transaction input component for receiving a database transaction directed to the configuration database, the database transaction having one or more specific updates effecting the configuration database;

a journal entry component for inserting an initial entry into a journal file, the initial entry including a transaction identifier, the initial entry corresponding to the database transaction, and for inserting one or more subsequent entries into the journal file corresponding to the one or more specific updates to the configuration database associated with the database transaction, the subsequent entry containing the transaction identifier and data relating to the specific update, and for inserting a final entry into the journal file according to a determination of whether each one of the one or more specific updates is successfully completed; and an update detector for determining whether each one of the one or more specific updates to the configuration database is successfully completed.

3. A computer readable medium including programming instructions arranged to perform multi-threaded journaling of transactions in a configuration database, the computer readable medium including programming instructions for:

receiving a database transaction directed to the configuration database, the database transaction having one or more specific updates effecting the configuration database;

inserting an initial entry corresponding to the database transaction into a journal file, the initial entry including a transaction identifier;

inserting one or more subsequent entries into the journal file corresponding to the one or more specific updates to the configuration database associated with the transaction, the subsequent entry containing the transaction identifier and data relating to the specific update;

determining whether each one of the one or more specific updates to the configuration database is successfully completed; and inserting a final entry into the journal file according to the determination of whether each one of the one or more specific updates is successfully completed.

4. A computer data signal embodied in a carrier wave and representing sequences of instructions arranged to perform multi-threaded journaling of transactions in a configuration database, the sequence of instructions comprising:

receiving a database transaction directed to the configuration database, the database transaction having one or more specific updates effecting the configuration database;

inserting an initial entry corresponding to the database transaction into a journal file, the initial entry including a transaction identifier;

inserting one or more subsequent entries into the journal file corresponding to the one or more specific updates to the configuration database associated with the transaction, the subsequent entry containing the transaction identifier and data relating to the specific update;

determining whether each one of the one or more specific updates to the configuration database is successfully completed; and inserting a final entry into the journal file according to the determination of whether each one of the one or more specific updates is successfully completed.

* * * * *